US006990410B2

(12) United States Patent
Boright et al.

(10) Patent No.: US 6,990,410 B2
(45) Date of Patent: Jan. 24, 2006

(54) CLOUD COVER ASSESSMENT: VNIR-SWIR

(75) Inventors: Arthur L. Boright, Bonney Lake, WA (US); John C. Sluder, Kent, WA (US)

(73) Assignee: The Boeing Company, Chicago, IL (US)

( * ) Notice: Subject to any disclaimer, the term of this patent is extended or adjusted under 35 U.S.C. 154(b) by 209 days.

(21) Appl. No.: 10/720,290

(22) Filed: Nov. 24, 2003

(65) Prior Publication Data

US 2005/0111692 A1    May 26, 2005

(51) Int. Cl.
G06F 19/00    (2006.01)
(52) U.S. Cl. .......................................... 702/3; 382/100
(58) Field of Classification Search .............. 702/3, 702/1, 2, 4, 5; 382/100, 109; 345/426, 419; 348/25; 250/339.08

See application file for complete search history.

(56) References Cited

U.S. PATENT DOCUMENTS

| | | | | |
|---|---|---|---|---|
| 4,465,940 | A * | 8/1984 | Graff et al. .................... | 348/25 |
| 4,921,349 | A * | 5/1990 | Richards ...................... | 356/229 |
| 5,075,856 | A * | 12/1991 | Kneizys et al. ................ | 702/3 |
| 5,088,833 | A | 2/1992 | Tsang et al. | |
| 5,884,226 | A * | 3/1999 | Anderson et al. .............. | 702/3 |
| 6,531,701 | B2 * | 3/2003 | Chou et al. ............ | 250/339.08 |
| 6,697,065 | B1 * | 2/2004 | Furuhashi et al. .......... | 345/426 |
| 2001/0017623 | A1 * | 8/2001 | Baron et al. ................ | 345/419 |
| 2005/0036661 | A1 * | 2/2005 | Viggh ........................ | 382/109 |
| 2005/0111692 | A1 * | 5/2005 | Boright et al. .............. | 382/100 |
| 2005/0114026 | A1 * | 5/2005 | Boright et al. ................. | 702/3 |
| 2005/0114027 | A1 * | 5/2005 | Boright et al. ................. | 702/3 |

OTHER PUBLICATIONS

Ackerman, S. A., et al., "Discriminating Clear Sky From Clouds With MODIS," Journal of Geophysical Research, Dec. 27, 1998, vol. 103, No. D24, pp. 32, 141-32, 157.

Adler-Golden, S.M., et al., "An Algorithm for De-Shadowing Spectral Imagery," presented at the AVIRIS Earth Sciences and Applications Workshop, at the NASA Jet Propulsion Laboratory (2002).

Boardman, J. W., 1993, "Automating Spectral Unmixing of AVIRIS Data Using Convex Geometry Concepts," in: Summaries of the Fourth Annual JPL Airborne Geoscience Workshop, Washington, D.C., v. 1.

Choi, K-Y., et al., "A Multispectral Transform for the Suppression of Cloud Shadows," presented at the Fourth International Airborne Remote Sensing Conf. and Exhibition/$21^{st}$ Canadian Symposium on Remote Sensing, Ottawa, Ontario, Canada, Jun. 11-14, 1999.

(Continued)

*Primary Examiner*—Andrew H. Hirshfeld
*Assistant Examiner*—Victor J. Taylor
(74) *Attorney, Agent, or Firm*—Black Lowe & Graham, PLLC

(57) ABSTRACT

Methods, a computer-readable medium, and a system are provided for determining whether a data point indicates a presence of a cloud using visible near-infrared data and short wavelength infrared data. A first comparison of a cirrus-band reflectance of the data point with a threshold cirrus-band reflectance value is made, classifying the data point as a cloud point if the cirrus-band reflectance of the data point exceeds the threshold cirrus-band reflectance value. When the comparing of the cirrus-band reflectance of the data point with the threshold cirrus-band reflectance value does not classify the data point as a cloud point, a further analysis is performed, including performing a second or more comparisons of additional cloud indicators derived from at least one of the visible, near-infrared, and short wavelength infrared data with related empirically-derived, landcover-dependent thresholds for classifying the data point as a cloud point or a non-cloud point.

80 Claims, 5 Drawing Sheets

OTHER PUBLICATIONS

Diner, D. J., et al., "Earth Observing System Multi-angle Imaging Spectro-Radiometer (MISR) Level 1 Cloud Detection Algorithm Theoretical Basis," Jet Propulsion Laboratory, California Institute of Technology, Dec. 7, 1999, vol. D-13397, Rev. B, pp 1-38.

Gao, B-C., et al., An Algorithm Using Visible and 1.38-$\mu$m Channels to Retrieve Cirrus Cloud Reflectances from Aircraft and Satellite Data, IEEE Transactions on Geoscience and Remote Sensing, Aug. 2002, vol. 40, No. 8, pp. 1659-1668.

Gao, B-C., and Kaufman, Y. J., "Selection of the 1.375-$\mu$m MODIS Channel for Remote Sensing of Cirrus Clouds and Stratospheric Aerosols from Space," American Meterological Society, Journal of the Atmospheric Sciences, Dec. 1, 1995, vol. 52, No. 23, pp. 4231-4237.

Gao, B-C., et al., "Correction of Thin Cirrus Path Radiances in the 0.4-1.0 $\mu$m Spectral Region Using the Sensitive 1.375 $\mu$m Cirrus Detecting Channel," J. Geophy. Research, Dec. 27, 1998, vol. 103, No. D24, pp. 32, 169-32, 176.

Goodman, A. H. and Henderson-Sellers, A., "Cloud Detection and Analysis: A Review of Recent Progress," Atmospheric Research, 1988, vol. 21, Nos. 3-4, pp. 229-240.

Gwinner, K., et al., "A Case Study on the Influence of Shadows and Shading on Multispectral Airborne Imaging Data," presented at the Third International Airborne Remote Sensing Conf. and Exhibition, Jul. 7-10, 1997 Copenhagen, Denmark.

Irish, R.R., "Landsat 7 Automatic Cloud Cover Assessment, in Algorithms for Multispectral, Hyperspectral, and Ultraspectral Imagery VI," S. S. Chen, M. R. Descour, Editors, Proceedings of SPIE, 2000, vol. 4049, pp. 348-355.

King, M. D., et al., "Discriminating Heavy Aerosol, Clouds, and Fires During SCAR-B: Application of Airborne Multispectral MAS Data," J. Geophy. Research, Dec. 27, 1998, vol. 103, No. D24, pp. 31,989-31,999.

Lissens, Gil, "Development of a Cloud, Snow and Cloud Shadow Mask for VEGETATION Imagery," in *Proc. Vegetation 2000: 2 Years of Operation to Prepare the Future Workshop*, G. Saint, Ed., Apr. 3-6, 2000, pp. 303-306.

Logar, A., et al., "A Hybrid Historam/Neural Network Classifier for Creating Global Cloud Masks," International Journal of Remote Sensing, 1997, vol. 18, No. 4, pp. 847-869.

Logar, A. M., et al., The ASTER Polar Cloud Mask,: IEEE Transactions of Geoscience and Remote Sensing, Jul. 1998, vol. 36, No. 4, pp. 1302-1312.

Milton, E. J., et al., "Cloud Shadow Suppression Using a Feature Space Approach to the Identification of Virtual Endmembers," Proceedings of 25th Annual Conference and Exhibition of the Remote Sensing Society, Cardiff, UK (1999).

Rossow, W. B., et al., "Global, Seasonal Cloud Variations from Satellite Radiance Measurements. Part l: Sensitivity of Analysis," Journal of Climate, May 1989, vol. 2, pp. 419-460.

Rossow, W. B., et al., "ISCCP Cloud Algorithm Intercomparison," Journal of Climate and Applied Meteorology, Sep. 1985, vol. 24, No. 9, pp. 877-903.

Rossow, W. B., "Measuring Cloud Properties from Space: A Review," Journal of Climate, Mar. 1989, vol. 2, pp. 201-215.

Sèze, G., et al., "Cloud Cover Observed Simultaneously from POLDER and METEOSAT," Physics and Chemistry of the Earth Part B: Hydrology, Oceans and Atmosphere, 1999, vol. 24, No. 8, pp. 921-926.

Simpson, J. J., et al., "A Procedure for the Detection and Removal of Cloud Shadow from AVHRR Data Over Land," IEEE Transactions on Geoscience and Remote Sensing, vol. 36, No. 3, pp. 880-897, May 1998.

Simpson, J. J., et al., "Cloud Shadow Detection Under Arbitrary Viewing and Illumination Conditions," IEE Transactions on Geoscience and Remote Sensing, Mar. 2000, vol. 38, No. 2, pp. 972-976.

Varlyguin, D. L., et al., Advances in Land Cover Classification for Applications Research: A Case Study from The Mid-Atlantic RESAC. Available at www.geog.umd.edu/resac and on ASPRS-2001 CD-ROM in American Society for Photogrammetry and Remote Sensing (ASPRS) Conference Proceedings, Washington DC (2001).

Vermote, E. F., et al., "A SeaWiFS Global Monthly Coarse-Resolution Reflectance Dataset," International Journal of Remote Sensing, 2001, vol. 22, No. 6, pp. 1151-1158.

Wang, B., et al., "Automated Detection and Removal of Clouds and their Shadows from Landsat TM Images," IEICE Trans., Inf. & Syst., vol. E82-D, No. 2, Feb. 1999.

Ackerman, S. A., et al., "Discriminating Clear Sky From Clouds With MODIS," Journal of Geophysical Research, Dec. 27, 1998, vol. 103, No. D24, pp. 32, 141-32, 157.

Chen S. S., "Landsat 7 Automatic Cloud Cover Assessment, R.R. Irish, in Algorithms for Multispectral, Hyperspectral, and Ultraspectral Imagery VI," M.R. Descour, Editors, Proceedings of SPIE, 2000, vol. 4049, pp. 348-355.

Diner, D. J., et al., "Earth Observing System Multi-angle Imaging Spectro-Radiometer(MISR) Level 1 Cloud Detection Algorithm Theoretical Basis," Jet Propulsion Laboratory, California Institute of Technology, Dec. 7, 1999, vol. D-13397, Rev. B, pp 1-38.

Gao, B-C., et al., "Correction of Thin Cirrus Path Radiances in the 0.4-1.0 $\mu$ m Spectral Region Using the Sensitive 1.375 $\mu$ m Cirrus Detecting Channel," Journal of Geophysical Research, Dec. 27, 1998, vol. 103, No. D24, pp. 32, 169-32, 176.

Goodman, A. H. and Henderson-Sellers, A., "Cloud Detection and Analysis: A Review of Recent Progress," Atmospheric Research, 1988, vol. 21, Nos. 3-4, pp. 229-240.

Gao, B-C., and Kaufman, Y. J., "Selection of the 1.375-$\mu$ m MODIS Channel for Remote Sensing of Cirrus Clouds and Stratospheric Aerosols from Space," American Meterological Society, Journal of the Atmospheric Sciences, Dec. 1, 1995, vol. 52, No. 23, pp. 4231-4237.

King, M. D., et al., "Discriminating Heavy Aerosol, Clouds, and Fires During SCAR-B: Application of Airborne Multispectral MAS Data," Journal of Geophysical Research, Dec. 27, 1998, vol. 103, No. D24, pp. 31,989-31,999.

Logar, A., et al., "A Hybrid Historam/Neural Network Classifier for Creating Global Cloud Masks," International Journal of Remote Sensing, 1997, vol. 18, No. 4, pp. 847-869.

Logar, A. M., et al., The ASTER Polar Cloud Mask,: IEEE Transactions of Geoscience and Remote Sensing, Jul. 1998, vol. 36, No. 4, pp. 1302-1312.

Rossow, W. B., et al., "Global, Seasonal Cloud Variations from Satellite Radiance Measurements. Part l: Sensitivity of Analysis," Journal of Climate, May 1989, vol. 2, pp. 419-460.

Rossow, W. B., et al., "ISCCP Cloud Algorithm Intercomparison," Journal of Climate and Applied Meteorology, Sep. 1985, vol. 24, No. 9, pp. 877-903.

Rossow, W. B., "Measuring Cloud Properties form Space: A Review," Journal of Climate, Mar. 1989, vol. 2, pp. 201-215.

Sèze, G., et al., "Cloud Cover Observed Simultaneously form POLDER and METEOSAT," Physics and Chemistry of the Earth Part B: Hydrology, Oceans and Atmosphere, 1999, vol. 24, No. 8, pp. 921-926.

Vermote, E. F., et al., "A SeaWiFS Global Monthly Coarse-Resolution Reflectance Dataset," International Journal of Remote Sensing, 2001, vol. 22, No. 6, pp. 1151-1158.

* cited by examiner

CLOUD COVER ASSESSMENT: VNIR-SWIR

FIELD OF THE INVENTION

This invention relates generally to image processing and, more specifically, to detection of cloud cover in high-altitude and/or orbital overhead imaging data.

BACKGROUND OF THE INVENTION

Overhead imaging studies of a surface below may be hampered by the presence of cloud formations. Understandably, thick clouds between an observation point and the area of interest under observation can conceal objects or features in the area of interest. Potentially worse in some cases is the presence of thinner cloud formations that do not entirely occlude the surface, but may reduce the contrast of surface features and change the derived surface spectral reflectance signature with resulting impact on information products such as spectral vegetation indices. Presence of thin cloud formations, such as cirrus clouds, can skew the analysis of such surface features by causing researchers to confuse presence of cloud features for features or changes in the surface region of study. For example, FIG. 1A shows a representative image 100 of a surface area under study. Merely looking at the image, it may be difficult to determine which aspects of the image are surface features 110 and which aspects are cloud features 120.

Because the presence of cloud formations can interfere with the accuracy of overhead imaging studies, methodologies have been developed to detect the presence of cloud formations so that accuracy of surface studies will not be undermined by undetected cloud patterns. One approach is to use "clear-sky" spectral or reflectance maps of the areas of interest to detect the presence of clouds. By comparing the clear-sky maps with current imaging data, large-area spectral or reflectance changes may signal the presence of cloud cover. This approach involves successfully collecting, verified clear-sky imaging data of the area of interest. The clear-sky maps typically are created using thermal infra-red measurements to determine the presence of cloud formations. Most cloud formations, including high altitude cirrus clouds made up of ice crystals, present a distinct, differentiable thermal signature. If thermal data indicates the presence of cirrus or other clouds in an area of study, it will be understood which portions of the image data are affected by the presence of clouds. Thus, analysis of the area of interest will not be distorted by the presence of undetected cloud formations.

FIG. 1B shows a "cloud mask" 150 derived using conventional techniques to show the cloud features 120 in the original image 100 of FIG. 1A. Absent the cloud mask 150, it can be appreciated that it might have been easy to confuse edges of cloud patterns 120 with surface features 110.

Unfortunately, as is readily appreciated, collection of thermal-infra red data requires equipment capable of gathering thermal-infrared data. In the realm of orbital satellites, integrating such equipment into the satellite increases cost. Additional telemetry involved in making use of such data also is resource-intensive and costly.

Even where such clear-sky data are available, continual accurate analytical comparison of archival clear-sky data with currently-captured imaging data is needed to ensure that the captured data represents suitably accurate, cloud-free images. Determination of whether the imaging data is suitably cloud-free is a significant concern. If it is not accurately determined whether captured images are suitably cloud-free, it may be necessary to arrange for the areas of interest to be re-imaged. Analysts who desire to use images from an image archive need to be assured that the image data is sufficiently cloud-free to be worthy of acquisition and use in their research. In addition, before quantitative analysis tools are applied to analyze the imaging data, the imaging data must be determined to be suitably cloud-free to ensure that the resulting quantitative analyses will be correct.

Thus, there is an unmet need in the art for a method for determining presence of clouds in aerial imaging data not involving use of special thermal infra-red sensing equipment or the data collected by such equipment.

SUMMARY OF THE INVENTION

Embodiments of the present invention can be used to determine the presence of clouds without involving thermal infrared detecting equipment. Embodiments of the present invention use spectral and spatial tests applied to pixel-level spectral measurements to determine the presence of cloud formations. The tests are computationally simple and, thus, do not impose an unreasonable operational computing workload. A sequence of such tests may be successively applied to the pixel-level spectral measurements to classify the pixel as indicating presence or absence of a cloud.

The present invention comprises methods, a computer-readable medium storing instructions, and a system for determining whether a data point of an image indicates a presence of a cloud using data including visible, near-infrared (NIR), and short wavelength infrared (SWIR) data. In one embodiment, a first comparison of a cirrus-band reflectance of a data point with a threshold cirrus-band reflectance value is made, classifying the data point as a cloud point if the cirrus-band reflectance of the data point exceeds the threshold cirrus-band reflectance value. When the comparing of the cirrus-band reflectance of the data point with the threshold cirrus-band reflectance value does not sufficiently classify the data point as a cloud point, a further analysis of the data point is performed. The further analysis includes performing a second comparison of an additional cloud indicator with an additional cloud indicator threshold, the additional cloud indicator being derived from at least one of the visible, near-infrared, and/or short wavelength infrared data. The data point is classified as one of a cloud point or a non-cloud-point when the second comparison of the additional cloud indicator with the additional cloud indicator threshold allows the data point to be classified as one of a cloud point or a non-cloud point.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, the present invention comprises methods, a computer-readable medium storing instructions, and a system for determining whether a data point of an image indicates a presence of a cloud using data including visible, near-infrared, and short wavelength infrared data. In one embodiment, a first comparison of a cirrus-band reflectance of a data point with a threshold cirrus-band reflectance value is made, classifying the data point as a cloud point if the cirrus-band reflectance of the data point exceeds the threshold cirrus-band reflectance value. When the comparing of the cirrus-band reflectance of the data point with the threshold cirrus-band reflectance value does not sufficiently classify the data point as a cloud point, a further analysis of the data point is performed. The further analysis includes performing a second comparison of an additional cloud indicator with an additional cloud indicator threshold, the additional cloud indicator being derived from at least one of the visible, near-infrared, and/or short wavelength infrared data. The data point is classified as one of a cloud point or a non-cloud-point when the second comparison of the additional cloud indicator with the additional cloud indicator threshold allows the data point to be classified as one of a cloud point or a non-cloud point.

Studying images, empirically it can be determined for each of these data points whether the data point signifies a cloud point or a non-cloud point. It will be appreciated that, in accordance with embodiments of the present invention, a number of quantities can be calculated for each data point using data extractable from visible, near-infrared, and short-wavelength infrared data. By studying these calculated quantities, threshold values are determinable by which the calculated quantities suitably are used to automatically determine whether a data point represents a cloud point or a non-cloud point. It will also be appreciated that, although embodiments of the present invention may analyze data to determine a presence of both visible clouds and sub-visible cloud layers, a presently preferred embodiment of the present invention is tailored to classifying data points based on whether the data points indicate the presence of visible clouds.

Figure 1A:
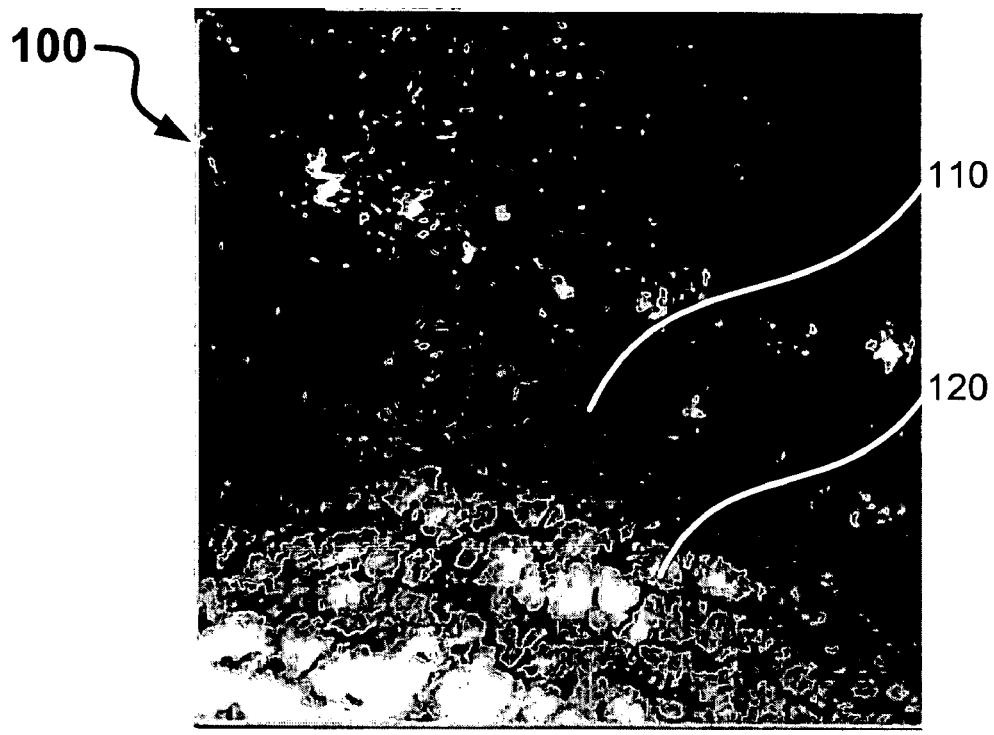
FIG. 1A is a conventional aerial image of an exemplary region of interest in accordance with the prior art.
Figure 1B:
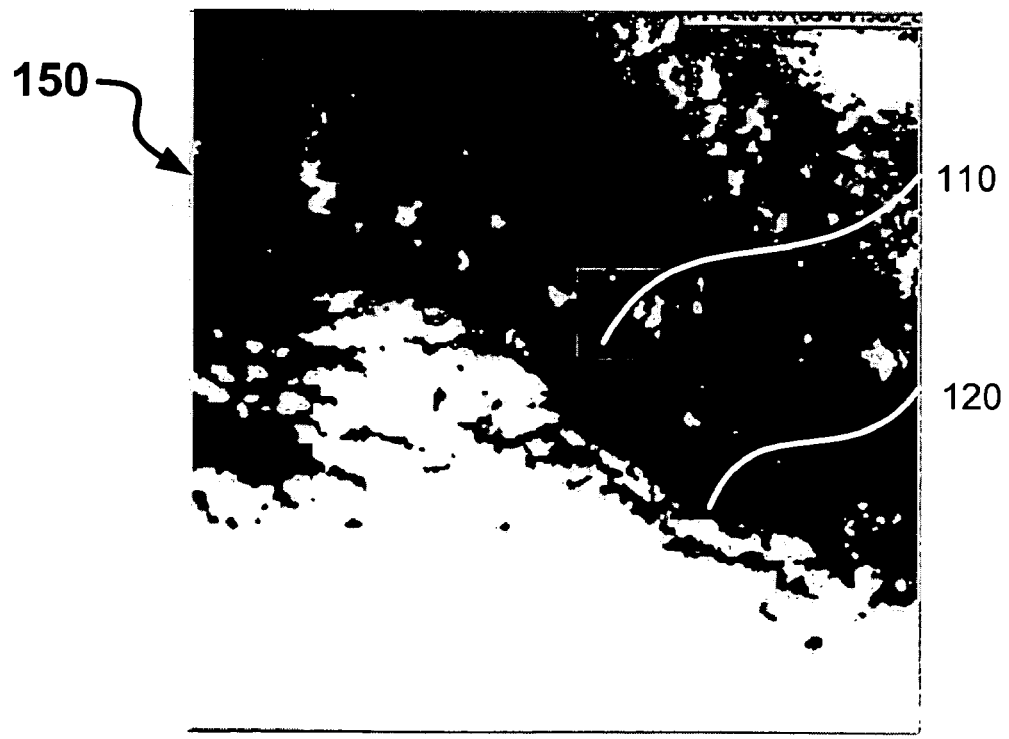
FIG. 1B is a conventional cloud mask derived from conventional techniques to indicate the presence of clouds in the image of the exemplary region of interest in accordance with the prior art.
Figure 2:
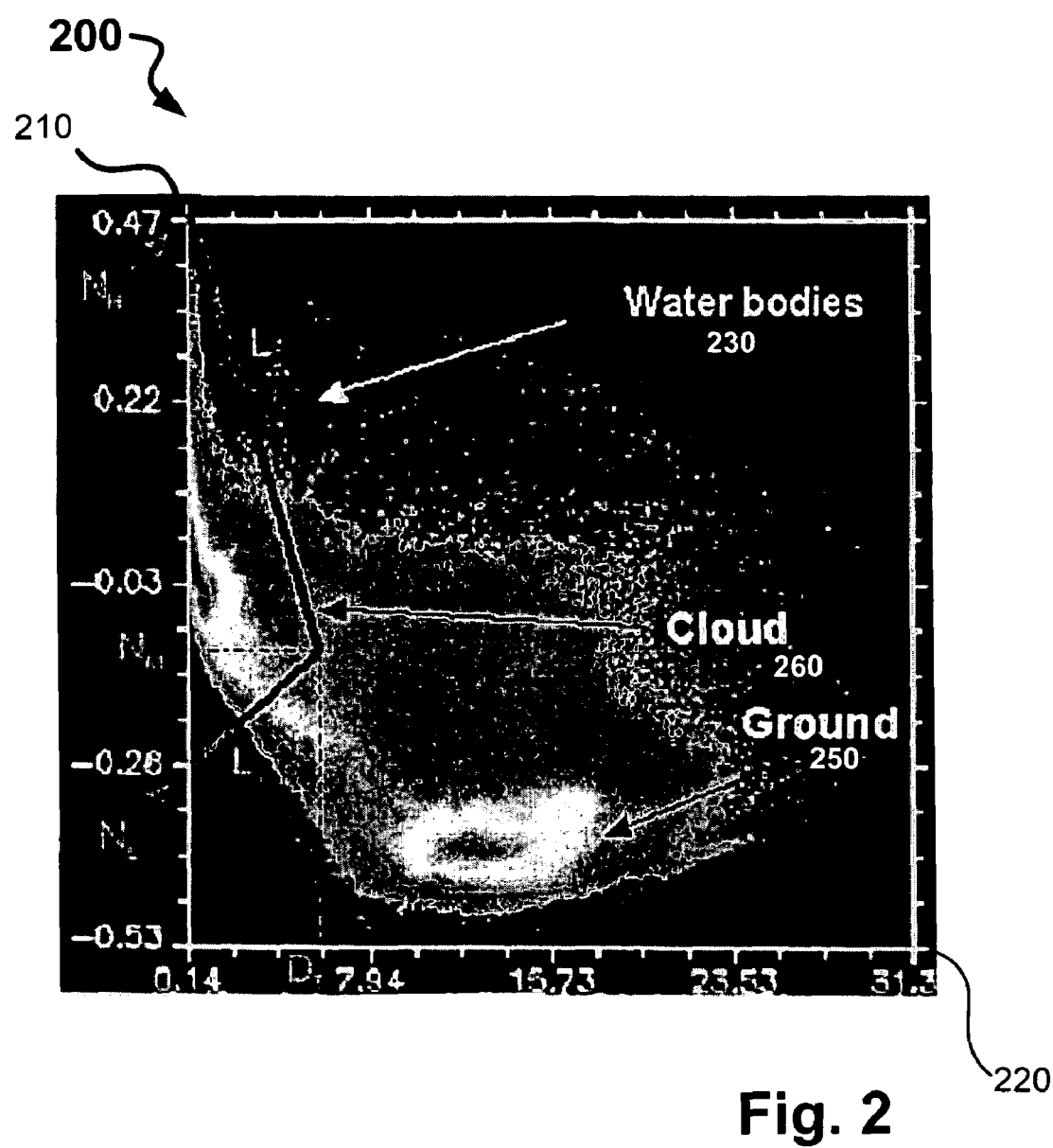
FIG. 2 is a graph plotting NDSI values versus D values and illustrating points where clouds are present.

FIG. 2 shows an exemplary graph 200 of such calculated quantities. Examining such a graph or other data representation in conjunction with associated cloud masks and RGB image, it can be determined what data points should be classified as cloud points and which should be classified as non-cloud points. More specifically, the graph shows normalized difference snow index, NDSI, plotted on a vertical axis 210 against values of a D variable on the horizontal axis 220. In one embodiment, NDSI is determined by equation (1):

$$NDSI = (\rho_{Green} - \rho_{SWIR1})/(\rho_{Green} + \rho_{SWIR1}) \quad (1)$$

The reflectance values, $\rho_{Green}$ and $\rho_{SWIR1}$, represent reflectance in the selected wavelength range, such as the green wavelengths, the short-wave infrared wavelength, respectively. The D variable, in turn, is determined from a normalized difference vegetation index, NDVI, respectively determined from equations (2) and (3):

$$D = |NDVI|^{0.6}/(\rho_{Red})^2 \quad (2)$$

$$NDVI = (\rho_{NIR} - \rho_{Red})/(\rho_{NIR} + \rho_{Red}) \quad (3)$$

The reflectance values, $\rho_{Red}$ and $\rho_{NIR}$, represent reflectance in the selected wavelength range, such as the red wavelengths, the near-infrared wavelengths, respectively.

The graph 200 shows values of NDSI versus D for data points that have been empirically identified by manual, visual inspection of an area of interest as representing bodies of water 230, ground 250, and clouds 260. Thus, because the data used in deriving NDSI, D, and NDVI is derivable from visible/near-infrared and short-wavelength infrared data, data points representing cloud points and non-cloud points can be identified without separate thermal infrared data.

A comparable analysis is achievable using different formulations of D. For example, in analyzing data collected by the Multiangle Imaging SpectroRadiometer (MISR) sensor used by NASA, D is calculated by raising NDVI to different exponential values depending on a type of ground cover expected to be present in the surface being imaged. Although the MISR D use is more complex because of its landcover-type-dependent NDVI exponent and large, statistically derived, D-threshold database, MISR D values also can be used with embodiments of the present invention to achieve satisfactory results.

Embodiments of the present invention can employ a number of such quantities to classify data points as cloud points or non-cloud points. Selection, ordering, calculation, and comparison of such quantities can be made in order to balance computational burdens and desired classification precision. For example, in two exemplary embodiments described below, a first comparison involves reflectance in the cirrus-band wavelengths, $\rho_{C1}$, with a threshold value which provides a ready, reliable first step in classifying data points as either cloud points or non-cloud points. In contrast with NDSI or D, $\rho_{C1}$ can be compared to a threshold value without additional computation, thus making a comparison of $\rho_{C1}$ as a first step can reduce computational burdens. It will also be appreciated that the steps can be ordered to evaluate potentially more reliable classifiers first, or the steps can be ordered to provide a logical AND or OR construct to provide for reliable classification of the data points.

Depending upon the computational resources available, it will be appreciated that analysis of data points can occur in real-time, while analysis of classification precision vs. computing load may occur in non-real-time. If non-real-time analyses indicate that greater precision can be achieved, to better meet user needs within available computing resources, by adjusting thresholds or adding additional cited tests to the real-time test hierarchy for specific background landcover types, locations, or times of year, those revisions can be made for future real-time processing.

Figure 3:
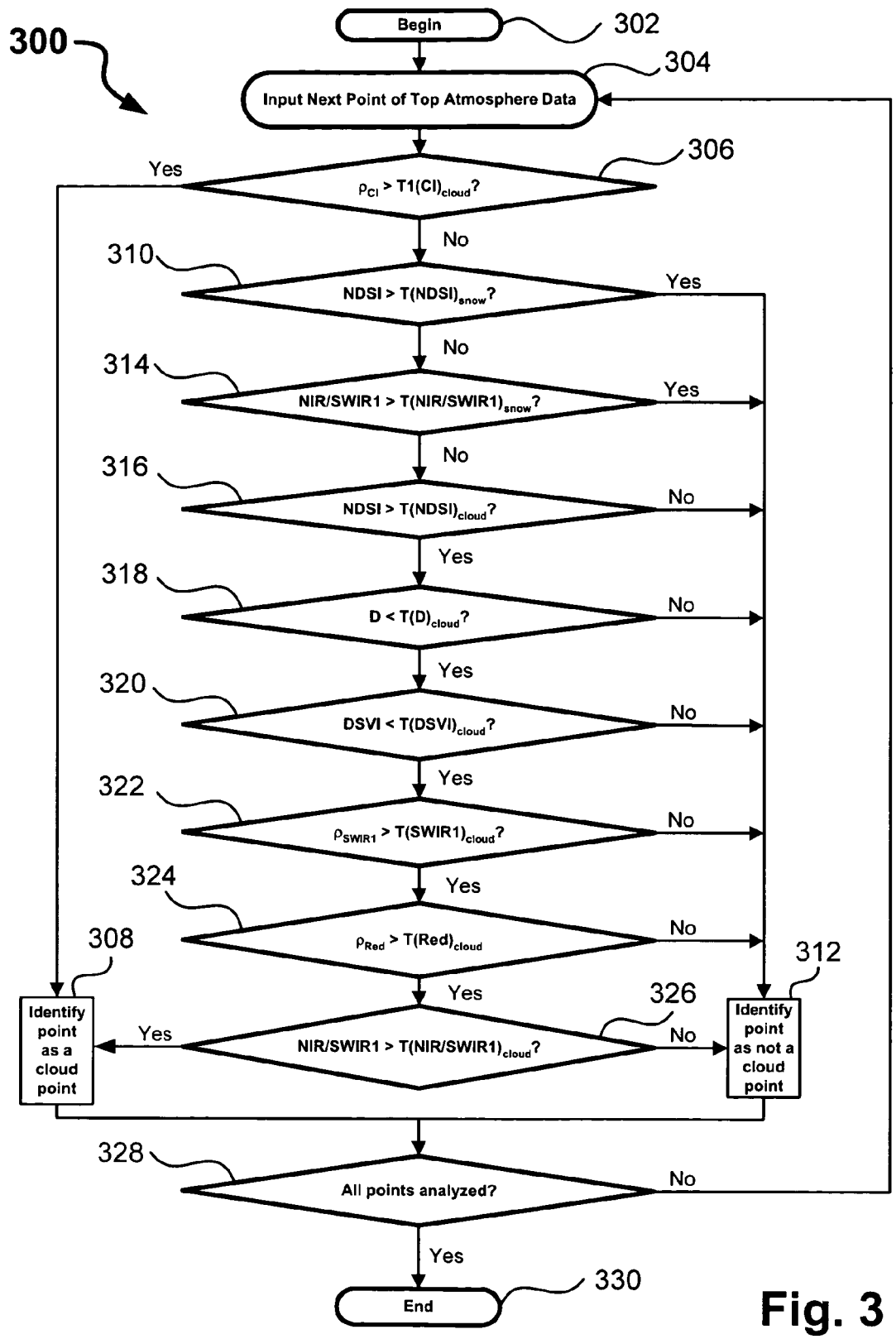
FIG. 3 is a flowchart of a routine according to an embodiment of the present invention for determining presence of cloud formations.

FIG. 3 shows a first embodiment of a routine 300 for classifying data points as cloud points or non-cloud points. The routine 300 begins at a block 302, and a next point of top of atmosphere, visible, near-infrared, and short-wavelength infrared data is submitted for processing at a block 304. At a block 306, a comparison of the $\rho_{C1}$ to a cirrus-band threshold cloud value is made. If $\rho_{C1}$ exceeds the threshold value, the data point is classified as a cloud point at a block 308. If not, the routine 300 proceeds to a next block to make a further comparison of whether the data point represents a cloud point or a non-cloud point.

In one particular embodiment, the $\rho_{C1}$ comparison at the block 306 is made at a wavelength of 1.88 $\mu$m. At this wavelength, the reflectance has been determined to be more reliable than at slightly lower wavelengths. Of course, in alternate embodiments, $\rho_{C1}$ may be tested at wavelengths other than 1.88 $\mu$m, such as at 1.38 $\mu$m or other cirrus bands.

If the comparison of $\rho_{C1}$ at the block 306 to make an initial determination of whether the data point was a cloud point did not result in the data point being classified as a cloud point at the block 308, additional comparisons can be made to further differentiate whether the data point is a cloud point or a non-cloud point. The comparisons and number of comparisons selected suitably are chosen to balance between computational simplicity and classification precision. Generally, as a greater number of comparisons are performed, greater precision is obtained. Nonetheless, selecting a fewer number of comparisons may result in a desirable degree of accuracy with fewer comparisons and/or calculations being made.

More specifically, if the comparison of the data point at the block 306 does not result in the data point being identified as a cloud point at the block 308, at a block 310 the NDSI is compared to an NDSI snow threshold value. This comparison may eliminate data points showing snow. If the data point NDSI is greater than the NDSI snow threshold value, the data point is a snow point. Again, the NDSI threshold value may be empirically determined using other information from which data points have previously been classified as cloud points or non-cloud points. If at the block 310 the NDSI exceeds the NDSI snow threshold value, the data point is classified as a non-cloud point at the block 312.

It will be appreciated how threshold values like the NDSI snow threshold value compared at the block 310 can affect classification precision. If, for example, the NDSI snow threshold is lowered, more data points may be classified as non-cloud ground points. If analysis reveals that this revision results in a net improvement in classification accuracy, application of further comparisons in the routine 300 may be avoided. Adjusting the thresholds in the tests described will determine how the individual data points in thinly cloud covered areas are classified. Accordingly, selection of thresholds based on empirical analysis of tested values for test data points known to be cloud points or non-cloud points over specific categories of landcover, location and season will incorporate a predetermined classification accuracy into embodiments of the present invention.

If the comparison of the data point at the block 310 does not result in the data point being identified as a non-cloud point at the block 312, then at a block 314, a comparison of a ratio of the near infrared data to the short-wavelength infrared data, NIR/SWIR1, to a NIR/SWIR1 snow threshold value is made to potentially eliminate data points showing snow. If the NIR/SWIR1 value exceeds the NIR/SWIR1 snow threshold value, the data point is classified as a non-cloud point at the block 312.

If the comparison of the data point at the block 314 does not result in the data point being identified as a non-cloud point at the block 312, then at a block 316 a comparison of a ratio of the NDSI value to an NDSI cloud threshold value is made to potentially eliminate data points showing bright ground. If the NDSI value is less than the NDSI cloud threshold value, the data point is classified as a non-cloud point at the block 312.

If the comparison of the data point at the block 316 does not result in the data point being identified as a non-cloud point at the block 312, at a block 318 a comparison of the D variable is made with a D variable cloud threshold to potentially eliminate data points showing vegetation. If the D variable is greater than the D variable cloud threshold, the data point is classified as a non-cloud point at the block 312.

If the comparison of the data point at the block 318 does not result in the data point being identified as a non-cloud point at the block 312, then at a block 320 a comparison of a D spatial variability index, DSVI, is made with a DSVI cloud threshold to potentially eliminate data points showing non-smooth features. In one particular embodiment, the D spatial variability index may be given by:

$$DSVI = |D_m - D_c| \qquad (4)$$

$D_m$ is mean of D values for at least a three-by-three matrix of data points surrounding the data point and $D_c$ is a central pixel in the three-by-three matrix of data points. If the DSVI is greater than the DSVI cloud threshold value, the data point is classified as a non-cloud point at the block 312.

It will be appreciated that calculation of the DSVI is a more computationally intensive step than other steps previously undertaken. The DSVI is derived from a plurality of D values which, in turn, are calculated from reflectance data of the data point. It will be appreciated that this step is not a first step in the routine 300 allowing for the possibility of faster, less-intensive methods associated with the foregoing blocks allowing for the data point to be classified as a cloud point 308 or a non-cloud point at the block 312. On the other hand, should additional computing power be available, the $D_m$ portion of DSVI could be computed for a larger matrix of points such as a mean of a five-by-five or larger matrix, centered on $D_c$. Use of a larger matrix can increase the accuracy of the DSVI comparison by providing a statistically better $D_m$ portion. If the comparison of the data point at the block 320 does not result in the data point being identified as a non-cloud point at the block 312, then at a block 322 a comparison of the short-wavelength reflectance, $\rho_{SWIR1}$, is made to a short-wavelength reflectance cloud threshold to potentially eliminate data points showing dark features. If $\rho_{SWIR1}$ is less than the short-wavelength reflectance cloud threshold, the data point is classified as a non-cloud point at the block 312.

If the comparison of the data point at the block 322 does not result in the data point being identified as a non-cloud point at the block 312, then at a block 324 a comparison of $\rho_{Red}$ to a red wavelength cloud threshold value is made to eliminate additional data points showing dark features. If $\rho_{Red}$ is less than the red wavelength cloud threshold value, the data point is classified as a non-cloud point at the block 312.

If the comparison of the data point at the block 324 does not result in the data point being identified as a non-cloud point at the block 312, then at a block 326, a comparison of a ratio of the NIR/SWIR1 to a NIR/SWIR1 cloud threshold value is made to potentially eliminate additional data points showing bright ground. If the NIR/SWIR1 value is less than the NIR/SWIR1 cloud threshold value the data point is classified as a non-cloud point at the block 312. On the other hand, if the NIR/SWIR1 value is greater than the NIR/SWIR1 cloud threshold value, the data point is classified as a cloud point at the block 308.

Once the data points have been classified as one of a cloud point at the block 308, or as a non-cloud point at the block 312, then at a block 328 it is determined if all data points of interest have been classified. If not, the routine 300 loops to the block 304 where the next data point is addressed. However, if it is determined at the block 328 that all the data points of interest have been analyzed, the routine 300 ends at the block 330.

As previously described, the routine 300 uses cloud thresholds empirically derived from manual or other studies of overhead imaging data. The threshold values may vary depending on the nature of the area of interest and the season during which the imaging data is captured. For example, threshold values for forests or closed shrub areas will vary between summer/tropical seasons and snowy seasons, just as the threshold values will vary between permanent wetlands and permanently snow-covered areas. For example, and not by way of limitation, Table 1 presented below lists representative threshold values that suitably may be used in the routine 300 for scenes and seasons of interest:

TABLE 1

| Scene | Season | D | $NDSI_{snow}$ | $NDSI_{cloud}$ | DSVI | $\rho_{SWIR1}$ | $NIR/SWIR1_{snow}$ | $NIR/SWIR1_{cloud}$ | $\rho_{Red}$ | $P_{Cloud}$ |
|---|---|---|---|---|---|---|---|---|---|---|
| Forest/Closed Shrub | Summer or Tropical | 20 | N/A | −0.25 | 1 | 0.1 | N/A | 1 | 0.1 | 0.03 |
| Forest/Closed Shrub | Spring or Fall without snow | 10 | N/A | −0.35 | 3.5 | 0.1 | N/A | 1 | 0.1 | 0.03 |
| Forest/Closed Shrub | Fall, Spring or Winter (snow) | 2 | 0.55 | −0.3 | 0.2 | 0.2 | 4 | N/A | 0.1 | 0.03 |
| Grass or Crops (Mosaic) | Summer | 20 (40) | N/A | −0.3 | 1 | 0.1 | N/A | 1 | 0.1 | 0.03 |
| Grass or Crops (Mosaic) | Spring or Fall w/o snow | 10 | N/A | −0.35 | 1 | 0.1 | N/A | 0.9 | 0.1 | 0.03 |
|  | Fall, Spring or Winder w/snow | 2 | 0.55 | −0.35 | 0.2 | 0.2 | 4 | 1 | 0.2 | 0.03 |
| Snow and Ice | All | 2 | 0.55 | −0.3 | 0.2 | 0.2 | 4 | N/A | 0.1 | 0.03 |
| Barren or Sparse Open Shrub | (No Snow) | 4 | N/A | −0.25 | 1 | 0.1 | N/A | 0.8 | 0.2 | 0.03 |
| Savanna | (No Snow) | 10 | N/A | −0.35 | 1 | 0.1 | N/A | 0.8 | 0.2 | 0.03 |

It will be appreciated that thresholds can be derived from study of other scenes and terrains, such as wetlands or water-covered areas as well.

Various combinations of tests can be used to optimally balance desires for accuracy and computing efficiency. For example, accurate results are obtainable according to a subset of the routine 300 (FIG. 3) where comparisons at the decision blocks 306, 316, 318, 320, and 326 and at least one of the comparisons at the decision blocks 310, 314, and 322. Table 2, on a next page, shows a computed accuracy for tests and combinations of tests run on a number of data sets.

TABLE 2

| Scene# | MAS ID | Truth % | Cirrus % | Error = Measured − Truth | | | | | | |
|---|---|---|---|---|---|---|---|---|---|---|
| 1 | 97047_21 | 51.33 | 43.1735 | 1.8217 | 1.8217 | 4.3696 | 4.3696 | 1.1733 | 1.1733 | 4.1394 |
| 2 | 97050_09 | 26.75 | 18.6906 | −3.0505 | −3.0505 | −4.0335 | −4.0335 | −4.6833 | −4.6833 | −4.1657 |
| 3 | 96110_26 | 61.36 | 60.1988 | −1.1286 | −1.1286 | −0.7469 | −0.7470 | −1.1433 | −1.1433 | −0.8238 |
| 4 | 96114_10 | 55.95 | 54.3096 | −1.2736 | −1.2736 | −1.2696 | −1.2696 | −1.2736 | −1.2736 | −1.2696 |
| 5 | 95116_02 | 78.66 | 78.0950 | −0.1030 | −0.1030 | 0.6430 | 0.6402 | −0.1030 | −0.1030 | 0.3881 |
| 6 | 01100_01 | 34.05 | 16.9678 | −6.2901 | −6.3132 | −6.2899 | −6.3129 | −6.2901 | −6.3132 | −6.2899 |
| 7 | 01100_02 | 60.58 | 53.1903 | −7.2377 | −7.2378 | −7.2377 | −7.2378 | −7.2377 | −7.2378 | −7.2377 |
| 8 | 01100_03 | 33.17 | 30.2151 | 0.0958 | 0.0958 | 0.1899 | 0.1895 | 0.0958 | 0.0958 | 0.1899 |
| 9 | 01100_04 | 0.64 | 0.3803 | −0.0373 | −0.0373 | −0.0359 | −0.0363 | −0.0373 | −0.0373 | −0.0359 |
| 10 | 01100_06 | 9.17 | 0.0000 | −5.1183 | −5.1187 | −4.9469 | −4.9782 | −5.1183 | −5.1187 | −4.9469 |
| 11 | 01100_07 | 22.36 | 1.7270 | 1.0630 | 1.0607 | 1.9494 | 1.9105 | 1.0630 | 1.0607 | 1.9494 |
| 12 | 01100_08 | 95.09 | 94.6252 | −0.0941 | −0.0941 | −0.0924 | −0.0936 | −0.0941 | −0.0941 | −0.0924 |
| 13 | 01100_09 | 26.26 | 0.7833 | −6.2423 | −6.2423 | −5.7884 | −5.7930 | −6.2423 | −6.2423 | −5.7884 |
| 14 | 01100_10 | 17.97 | 0.2624 | −4.2455 | −4.2455 | −4.0007 | −4.0012 | −4.2455 | −4.2455 | −4.0007 |
| 15 | 01110_03 | 2.01 | 0.0000 | −0.8531 | −0.8532 | −0.8256 | −0.8333 | −0.8531 | −0.8532 | −0.8256 |
| 16 | 01110_04 | 51.42 | 26.9409 | −1.9426 | −1.9426 | −1.7426 | −1.7426 | −1.9426 | −1.9426 | −1.7426 |
| 17 | 01110_05 | 84.58 | 81.2260 | 3.2395 | 3.2395 | 3.2444 | 3.2415 | 3.2395 | 3.2395 | 3.2444 |
| 18 | 01110_08 | 40.21 | 29.2289 | −1.6000 | −1.6001 | −1.2898 | −1.5814 | −1.6000 | −1.6001 | −1.2898 |
| 19 | 01110_11 | 57.00 | 48.7074 | −8.1113 | −8.1113 | −7.7620 | −7.7821 | −8.1113 | −8.1113 | −7.7620 |
| 20 | 01110_12 | 30.91 | 24.0226 | −6.2068 | −6.2068 | −6.1620 | −6.1817 | −6.2068 | −6.2068 | −6.1620 |
| 21 | 01110_13 | 48.18 | 45.0783 | −2.4732 | −2.4732 | −2.4102 | −2.4473 | −2.4732 | −2.4732 | −2.4102 |
| 22 | 01110_14 | 34.98 | 31.1644 | −2.4859 | −2.4859 | −2.4699 | −2.4703 | −2.4859 | −2.4859 | −2.4699 |

TABLE 2-continued

| | MAS ID | Truth % | Cirrus % | | | | | | | |
|---|---|---|---|---|---|---|---|---|---|---|
| 23 | 01110_15 | 79.84 | 77.3877 | 0.7629 | 0.7627 | 0.9420 | 0.9417 | 0.7629 | 0.7627 | 0.9420 |
| 24 | 01130_05 | 71.09 | 52.6079 | 0.0370 | 0.0370 | 0.0370 | 0.0370 | 0.0370 | 0.0370 | 0.0370 |
| 25 | 01130_07 | 62.95 | 48.5385 | 2.4181 | 2.4177 | 2.5489 | 2.5476 | 2.4181 | 2.4177 | 2.5489 |
| 26 | 01130_09 | 28.74 | 0.0002 | −0.4654 | −0.4654 | 0.4605 | 0.2763 | −0.4654 | −0.4654 | 0.4605 |
| 27 | 99030_01 | 52.68 | 23.1581 | −3.2878 | −3.2878 | −1.8294 | −1.8294 | −3.2878 | −3.2878 | −1.8294 |
| 28 | 95163_17 | 48.89 | 9.3589 | −1.2679 | −1.2679 | −0.5307 | −0.5307 | −1.2679 | −1.2679 | −0.5307 |
| 29 | 00176_05 | 50.89 | 0.0000 | 9.2824 | 4.9030 | 9.2826 | 4.9030 | 9.2824 | 4.9030 | 9.2826 |
| 30 | 00177_08 | 39.08 | 17.4549 | 2.2787 | −1.6414 | 2.2878 | −1.6414 | 2.2787 | −1.6414 | 2.2878 |
| | | | Test# 3 | 0 | 0 | 0 | 0 | 0 | 0 | 1 |
| | | | 4 | 0 | 0 | 1 | 1 | 1 | 1 | 0 |
| | | | 5 | 1 | 1 | 1 | 1 | 1 | 1 | 1 |
| | | | 6 | 1 | 1 | 1 | 1 | 1 | 1 | 1 |
| | | | 7 | 1 | 1 | 1 | 1 | 1 | 1 | 1 |
| | | | 8 | 1 | 1 | 0 | 0 | 1 | 1 | 0 |
| | | | 9 | 0 | 1 | 0 | 1 | 0 | 1 | 0 |
| | | | 10 | 1 | 1 | 1 | 1 | 1 | 1 | 1 |
| | | | #tests | 5 | 6 | 5 | 6 | 6 | 7 | 5 |
| | | | mean err | −1.4172 | −1.6947 | −1.1170 | −1.4162 | −1.4937 | −1.7713 | −1.1401 |

| Scene# | MAS ID | Truth % | Cirrus % | Error = Measured − Truth | | | | | | |
|---|---|---|---|---|---|---|---|---|---|---|
| 1 | 97047_21 | 51.33 | 43.1735 | 4.1394 | 1.2431 | 1.2431 | 3.8076 | 3.8076 | 1.1402 | 1.1402 |
| 2 | 97050_09 | 26.75 | 18.6906 | −4.1657 | −5.0715 | −5.0715 | −4.4495 | −4.4495 | −5.0809 | −5.0809 |
| 3 | 96110_26 | 61.36 | 60.1988 | −0.8238 | −1.1433 | −1.1433 | −0.8255 | −0.8255 | −1.1433 | −1.1433 |
| 4 | 96114_10 | 55.95 | 54.3096 | −1.2696 | −1.2736 | −1.2736 | −1.2696 | −1.2696 | −1.2736 | −1.2736 |
| 5 | 95116_02 | 78.66 | 78.0950 | 0.3876 | −0.1033 | −0.1033 | 0.3881 | 0.3876 | −0.1033 | −0.1033 |
| 6 | 01100_01 | 34.05 | 16.9678 | −6.3129 | −6.2901 | −6.3132 | −6.2899 | −6.3129 | −6.2901 | −6.3132 |
| 7 | 01100_02 | 60.58 | 53.1903 | −7.2378 | −7.2377 | −7.2378 | −7.2377 | −7.2378 | −7.2377 | −7.2378 |
| 8 | 01100_03 | 33.17 | 30.2151 | 0.1895 | 0.0958 | 0.0958 | 0.1899 | 0.1895 | 0.0958 | 0.0958 |
| 9 | 01100_04 | 0.64 | 0.3803 | −0.0363 | −0.0373 | −0.0373 | −0.0359 | −0.0363 | −0.0373 | −0.0373 |
| 10 | 01100_06 | 9.17 | 0.0000 | −4.9782 | −5.1183 | −5.1187 | −4.9469 | −4.9782 | −5.1183 | −5.1187 |
| 11 | 01100_07 | 22.36 | 1.7270 | 1.9105 | 1.0630 | 1.0607 | 1.9494 | 1.9105 | 1.0630 | 1.0607 |
| 12 | 01100_08 | 95.09 | 94.6252 | −0.0936 | −0.0941 | −0.0941 | −0.0924 | −0.0936 | −0.0941 | −0.0941 |
| 13 | 01100_09 | 26.26 | 0.7833 | −5.7930 | −6.2423 | −6.2423 | −5.7884 | −5.7930 | −6.2423 | −6.2423 |
| 14 | 01100_10 | 17.97 | 0.2624 | −4.0012 | −4.2455 | −4.2455 | −4.0007 | −4.0012 | −4.2455 | −4.2455 |
| 15 | 01110_03 | 2.01 | 0.0000 | −0.8333 | −0.8531 | −0.8532 | −0.8256 | −0.8333 | −0.8531 | −0.8532 |
| 16 | 01110_04 | 51.42 | 26.9409 | −1.7426 | −1.9426 | −1.9426 | −1.7426 | −1.7426 | −1.9426 | −1.9426 |
| 17 | 01110_05 | 84.58 | 81.2260 | 3.2415 | 3.2395 | 3.2395 | 3.2444 | 3.2415 | 3.2395 | 3.2395 |
| 18 | 01110_08 | 40.21 | 29.2289 | −1.5814 | −1.6000 | −1.6001 | −1.2898 | −1.5814 | −1.6000 | −1.6001 |
| 19 | 01110_11 | 57.00 | 48.7074 | −7.7821 | −8.1113 | −8.1113 | −7.7620 | −7.7821 | −8.1113 | −8.1113 |
| 20 | 01110_12 | 30.91 | 24.0226 | −6.1817 | −6.2068 | −6.2068 | −6.1620 | −6.1817 | −6.2068 | −6.2068 |
| 21 | 01110_13 | 48.18 | 45.0783 | −2.4473 | −2.4732 | −2.4732 | −2.4102 | −2.4473 | −2.4732 | −2.4732 |
| 22 | 01110_14 | 34.98 | 31.1644 | −2.4703 | −2.4859 | −2.4859 | −2.4699 | −2.4703 | −2.4859 | −2.4859 |
| 23 | 01110_15 | 79.84 | 77.3877 | 0.9417 | 0.7629 | 0.7627 | 0.9420 | 0.9417 | 0.7629 | 0.7627 |
| 24 | 01130_05 | 71.09 | 52.6079 | 0.0370 | 0.0370 | 0.0370 | 0.0370 | 0.0370 | 0.0370 | 0.0370 |
| 25 | 01130_07 | 62.95 | 48.5385 | 2.5476 | 2.4181 | 2.4177 | 2.5489 | 2.5476 | 2.4181 | 2.4177 |
| 26 | 01130_09 | 28.74 | 0.0002 | 0.2763 | −0.4654 | −0.4654 | 0.4605 | 0.2763 | −0.4654 | −0.4654 |
| 27 | 99030_01 | 52.68 | 23.1581 | −1.8294 | −3.2878 | −3.2878 | −1.8294 | −1.8294 | −3.2878 | −3.2878 |
| 28 | 95163_17 | 48.89 | 9.3589 | −0.5307 | −1.2679 | −1.2679 | −0.5307 | −0.5307 | −1.2679 | −1.2679 |
| 29 | 00176_05 | 50.89 | 0.0000 | 4.9030 | 9.2824 | 4.9030 | 9.2826 | 4.9030 | 9.2824 | 4.9030 |
| 30 | 00177_08 | 39.08 | 17.4549 | −1.6414 | 2.2787 | −1.6414 | 2.2878 | −1.6414 | 2.2787 | −1.6414 |
| | | | Test# 3 | 1 | 1 | 1 | 1 | 1 | 1 | 1 |
| | | | 4 | 0 | 0 | 0 | 1 | 1 | 1 | 1 |
| | | | 5 | 1 | 1 | 1 | 1 | 1 | 1 | 1 |
| | | | 6 | 1 | 1 | 1 | 1 | 1 | 1 | 1 |
| | | | 7 | 1 | 1 | 1 | 1 | 1 | 1 | 1 |
| | | | 8 | 0 | 1 | 1 | 0 | 0 | 1 | 1 |
| | | | 9 | 1 | 0 | 1 | 0 | 1 | 0 | 1 |
| | | | 10 | 1 | 1 | 1 | 1 | 1 | 1 | 1 |
| | | | #tests | 6 | 6 | 7 | 6 | 7 | 7 | 8 |
| | | | mean err | −1.4393 | −1.5044 | −1.7819 | −1.1607 | −1.4599 | −1.5081 | −1.7856 |

| Test# | Description |
|---|---|
| 1 | Cirrus band TOA reflectance >0.03; Always included in cloud % |
| 2 | NDSI test for shadowed snow; Does not impact cloud %; Not included in this analysis |
| 3 | NDSI test to eliminate snow |
| 4 | NIR/SWIR1 test to eliminate snow |
| 5 | NDSI test to eliminate bright ground |
| 6 | D test to eliminate veg |
| 7 | DSVI test to eliminate non-smooth features |
| 8 | SWIR1 band TOA reflectance test to eliminate dark features |
| 9 | Red band TOA reflectance test to eliminate dark features |
| 10 | NIR/SWIR1 test to eliminate bright ground |

Figure 4:
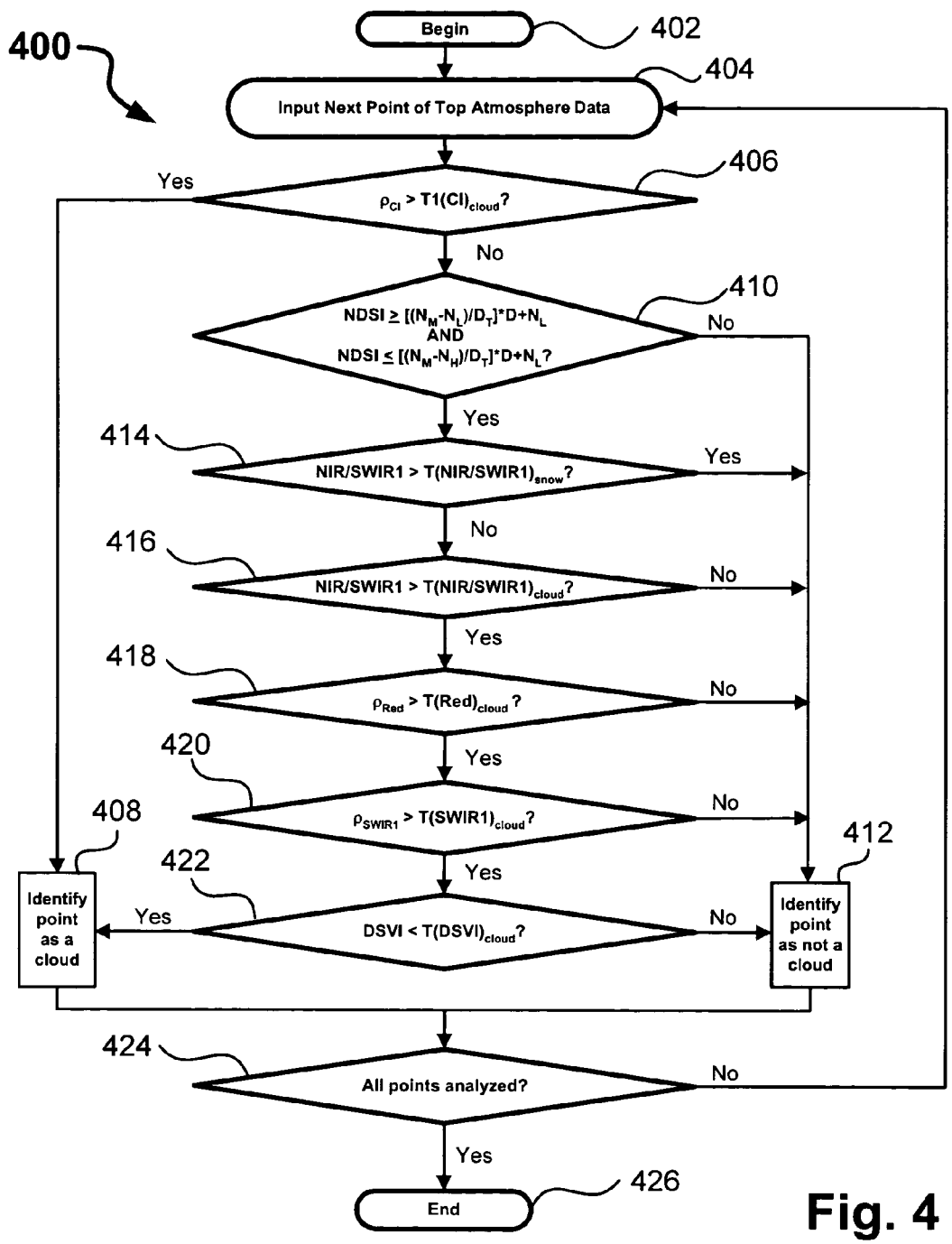
FIG. 4 is a flowchart of a routine according to another embodiment of the present invention for determining presence of cloud formations.

FIG. 4 shows a second embodiment of a routine 400 for classifying data points as cloud points or non-cloud points. The routine 400 begins at a block 402, and a next point of top of atmosphere visible, near-infrared, and short-wavelength infrared data is submitted for processing at a block 404. At a block 406, a comparison of the $\rho_{C1}$ to a cirrus-band threshold cloud value is made. If $\rho_{C1}$ exceeds the cloud threshold value, the data point is classified as a cloud point at a block 408. If not, the routine 400 proceeds to a next block to make a further comparison of whether the data point represents a cloud point or a non-cloud point.

If the comparison of the data point at the block 406 does not result in the data point being identified as a cloud point at the block 408, then at a block 410 the NDSI is compared to an NDSI minimum threshold value and an NDSI maximum threshold value. The NDSI thresholds are set according to empirical analysis of NDSI data such as that shown in FIG. 2. Unlike the routine shown in FIG. 3 which uses single-value cutoff thresholds, at the block 410 the threshold defines an area of the graph 200 (FIG. 2) as opposed to an intercept. More specifically, the comparison of NDSI at the block 410 is:

$$NDSI > [(N_M - N_L)/D_T]*D + N_L$$

AND $$NDSI < [(N_M - N_H)/D_T]*D + N_L$$

If either comparison is false, the data point is classified as a non-cloud point at a block 412. Values for these threshold calculation numbers are included in Table 2, below.

If the comparison of the data point at the block 410 does not result in the data point being identified as a non-cloud point at the block 412, at a block 414 a comparison of a ratio of NIR/SWIR1 to a NIR/SWIR1 snow threshold value is made. If the NIR/SWIR1 value is greater than the NIR/SWIR1 snow threshold value, the data point is classified as a non-cloud point at the block 412.

If the comparison of the data point at the block 414 does not result in the data point being identified as a non-cloud point at the block 412, then at a block 416 a comparison of a ratio of the NIR/SWIR1 value to an NIR/SWIR1 cloud threshold value is made. If the NIR/SWIR1 value is less than the NIR/SWIR1 cloud threshold value, the data point is classified as a non-cloud point at the block 412.

If the comparison of the data point at the block 416 does not result in the data point being identified as a non-cloud point at the block 412, then at a block 418 a comparison of $\rho_{Red}$ to a red wavelength cloud threshold value is made. If $\rho_{Red}$ is less than the red wavelength cloud threshold value, the data point is classified as a non-cloud point at the block 412.

If the comparison of the data point at the block 418 does not result in the data point being identified as a non-cloud point at the block 412, then at a block 420 a comparison of the short-wavelength reflectance, $\rho_{SWIR1}$, is made to a short-wavelength reflectance cloud threshold. If $\rho_{SWIR1}$ is less than the short-wavelength reflectance cloud threshold, the data point is classified as a non-cloud point at the block 412.

If the comparison of the data point at the block 420 does not result in the data point being identified as a non-cloud point at the block 412, then at a block 422 a comparison of the DSVI is made with a DSVI cloud threshold. If the DSVI exceeds the DSVI cloud threshold, the data point is classified as a non-cloud point at the block 412. On the other hand, if the DSVI is less than the DSVI cloud threshold, the data point is classified as a cloud point at the block 408.

Once the data points have been classified as one of a cloud point at the block 408 or as a non-cloud point at the block 412, then at a block 424 it is determined if all data points of interest have been classified. If not, the routine 400 loops to the block 404 where the next data point is addressed. However, if it is determined at the block 424 that all the data points of interest have been analyzed, the routine 400 ends at the block 426.

As previously described, the routine 400 uses threshold calculations empirically derived from manual or other studies of overhead imaging data. The threshold values may vary depending on the nature of the area of interest and the season during which the imaging data is captured. For example, threshold values for forests or closed shrub areas will vary between summer/tropical seasons and snowy seasons, just as the threshold values will vary between permanent wetlands and permanently snow-covered areas. Again, for example and not by way of limitation, Table 3 below lists representative threshold values that suitably may be used in the routine 400:

TABLE 3

| Scene | $T(CI)_{cloud}$ | $N_L$ | $N_M$ | $N_H$ | $D_T$ | $T(NIR/SWIR1)_{snow}$ | $T(NIR/SWIR1)_{cloud}$ | $\rho_{Red}$ | SWIR1 | DSVI |
|---|---|---|---|---|---|---|---|---|---|---|
| Forest - summer mid-latitude | 0.03 | −0.2 | −0.15 | 1 | 20 | N/A | 0.8 | 0.1 | 0.1 | 1 |
| Forest - tropical | 0.03 | −0.5 | −0.3 | 1 | 20 | N/A | 0.8 | 0.1 | 0.1 | 1 |
| Crops or Mosaic - Summer | 0.03 | −0.3 | −0.2 | 1 | 40 | N/A | 0.8 | 0.1 | 0.1 | 1 |
| Grass - Summer | 0.03 | −0.3 | −0.2 | 1 | 20 | N/A | 0.8 | 0.1 | 0.1 | 1 |
| Crops or Mosaic - Spring | 0.03 | −0.3 | −0.2 | 1 | 10 | N/A | 0.8 | 0.1 | 0.1 | 1 |
| Crops or Mosaic - Snow | 0.03 | −0.5 | −0.3 | 0.6 | 5 | 4 | 0.8 | 0.1 | 0.1 | 1 |

TABLE 3-continued

| Scene | T(CI)$_{cloud}$ | N$_L$ | N$_M$ | N$_H$ | D$_T$ | T(NIR/SWIR1)$_{snow}$ | T(NIR/SWIR1)$_{cloud}$ | ρ$_{Red}$ | SWIR1 | DSVI |
|---|---|---|---|---|---|---|---|---|---|---|
| Barren | 0.03 | −0.3 | −0.2 | 1 | 3 | N/A | 0.8 | 0.1 | 0.1 | 1 |
| Savanna or Open Shrub | 0.03 | −0.3 | −0.2 | 1 | 10 | N/A | 0.8 | 0.1 | 0.1 | 1 |

It will be appreciated that the routine 400 (FIG. 4) simplifies the selection of threshold values.

Figure 5:
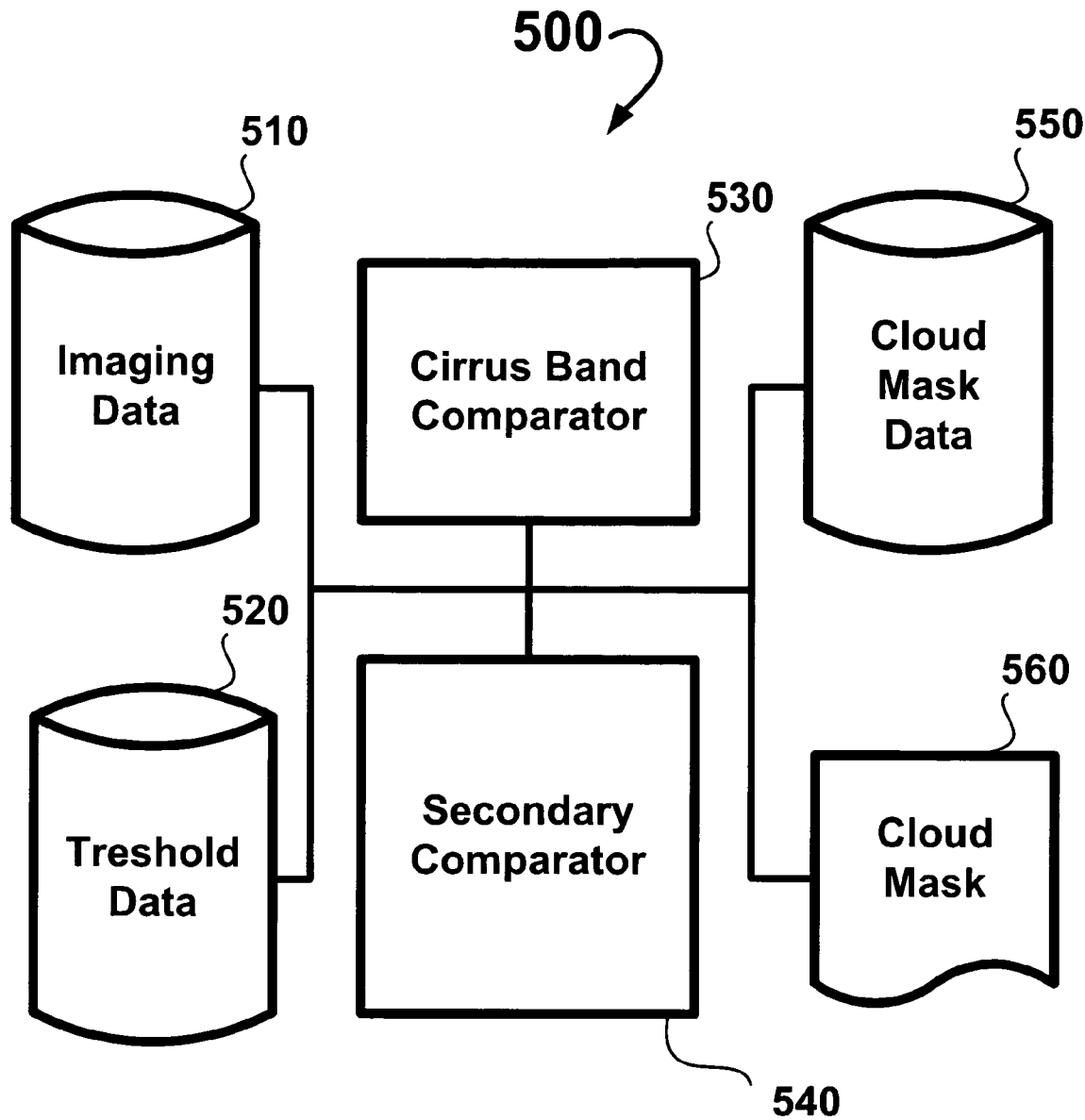
FIG. 5 is a block diagram of a system according to an embodiment of the present invention.

FIG. 5 shows a system 500 according to an embodiment of the present invention. Imaging data 510, including imaging data from at least one data point, is received. Threshold data 520, such as the parameters previously described in connection with FIGS. 3 and 4 and Tables 1 and 2, is supplied to the system for comparison. A cirrus band comparator 530 makes a first comparison of the data point with a cirrus band threshold. As previously described, if the cirrus band reflectance of the data point exceeds the cirrus band threshold, the data point is classified as a cloud point in cloud mask data 550 and/or a cloud mask 560. On the other hand, if use of the cirrus band comparator 530 does not result in classification of the data point, a secondary comparator 540 is applied to classify the data point. Using routines previously described in connection with FIGS. 3 and 4, the secondary comparator 540 uses additional cloud indicators and cloud indicator thresholds to classify the data points. When the secondary comparator 540 classifies the data point as either a cloud point or a non-cloud point, the data point is appropriately classified in the cloud mask data 550 and/or the cloud mask 560 in accordance with the predetermined classification precision determined by the threshold levels established for the comparisons being made. The system 500 suitably is applied to all data points in the imaging data 510 to generate cloud mask data 550 and/or a cloud mask 560 for the imaging data 510.

It will be appreciated that, in one embodiment of the invention, the determination as to acceptability of accuracy provided by a given set of tests and thresholds would be determined by processing a representative set of imagery off-line, and by evaluating resultant cloud masks in comparison with "truth" cloud masks produced by expert analysis. Adjustments would be iterated and evaluated for optimization, and production test hierarchy and thresholds would then be adjusted for subsequent on-line production runs.

While alternate and preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for determining whether a data point of an image indicates a presence of a cloud using data including visible, near-infrared, and short wavelength infrared data, the method comprising:
   performing a first comparison of a cirrus-band reflectance of the data point with a cirrus-band reflectance threshold and classifying the data point as a cloud point if the cirrus-band reflectance of the data point exceeds the cirrus-band reflectance threshold; and
   when the first comparison does not classify the data point as a cloud point, performing a further analysis of the data point including:
      performing a second comparison of an additional cloud indicator with an additional cloud indicator threshold, the additional cloud indicator being derived from at least one of the visible, near-infrared, and short wavelength infrared data; and
      classifying the data point as one of a cloud point or a non-cloud-point when the second comparison of the additional cloud indicator with the additional cloud indicator threshold allows the data point to be classified as one of a cloud point or a non-cloud point.

2. The method of claim 1, wherein the cirrus-band is approximately a 1.88 μm wavelength cirrus band.

3. The method of claim 1, wherein the cirrus-band is approximately a 1.38 μm wavelength cirrus band.

4. The method of claim 1, wherein the additional cloud indicator includes a normalized difference snow index and the additional cloud indicator threshold includes at least one normalized difference snow index threshold.

5. The method of claim 4, wherein the additional cloud indicator threshold includes a normalized difference snow index snow threshold such that the data point is classified as a non-cloud point when the normalized difference snow index exceeds the normalized difference snow index snow threshold.

6. The method of claim 4, wherein the additional cloud indicator threshold includes a normalized difference snow index snow threshold and a normalized difference snow index cloud threshold such that the data point is classified as a cloud point when the normalized difference snow index is greater than or equal to the normalized difference snow index cloud threshold and the normalized difference snow index is less than or equal to the normalized difference snow index snow threshold.

7. The method of claim 6, wherein the normalized difference snow index cloud threshold includes $[(N_M-N_L)/D_T]*D+N_L$ and the normalized difference snow index snow threshold includes $[(N_M-N_H)/D_T]*D+N_L$.

8. The method of claim 4, wherein the normalized difference snow index is:

$$NDSI=(\rho_{Green}-\rho_{SWIR1})/(\rho_{Green}+\rho_{SWIR1}).$$

9. The method of claim 1, wherein the additional cloud indicator includes a near infrared to short-wavelength infrared ratio and the additional cloud indicator threshold includes a near infrared to short-wavelength infrared ratio snow threshold such that the data point is classified as a non-cloud point when the near infrared to short-wavelength infrared ratio exceeds the near infrared to short-wavelength infrared ratio snow threshold.

10. The method of claim 1, wherein the additional cloud indicator includes a near infrared to short-wavelength infrared ratio and the additional cloud indicator threshold includes a near infrared to short-wavelength infrared ratio cloud threshold such that the data point is classified as a non-cloud point when the near infrared to short-wavelength infrared ratio is less than the near infrared to short-wavelength infrared ratio cloud threshold.

11. The method of claim 1, wherein the additional cloud indicator includes a red spectrum reflectance and the additional cloud indicator threshold includes a red spectrum reflectance cloud threshold such that the data point is classified as a non-cloud point when the red spectrum reflectance is less than the red spectrum reflectance cloud threshold.

12. The method of claim 1, wherein the additional cloud indicator includes a short-wavelength infrared reflectance and the additional cloud indicator threshold includes a short-wavelength reflectance cloud threshold such that the data point is classified as a non-cloud point when the short-wavelength reflectance is less than the short-wavelength reflectance cloud threshold.

13. The method of claim 1, wherein the additional cloud indicator includes a D variable and the additional cloud indicator threshold includes a D variable cloud threshold such that the data point is classified as a non-cloud point when the D variable exceeds the D variable cloud threshold.

14. The method of claim 13, wherein the D variable is:

$$D = |NDVI|_{0.6}/(\rho_{Red})^2$$

and where the normalized difference vegetation index, NDVI, is:

$$NDVI = (\rho_{NIR} - \rho_{Red})/(\rho_{NIR} + \rho_{Red}).$$

15. The method of claim 1, wherein the additional cloud indicator includes a D spatial variability index and the additional cloud indicator threshold includes a D spatial variability index cloud threshold such that the data point is classified as a non-cloud point when the a D spatial variability index is greater than the D spatial variability index cloud threshold.

16. The method of claim 15, wherein the D spatial variability index is:

$$DSVI = |D_m - D_c|$$

where $D_m$ is mean of D values for a matrix of data points including at least a three-by-three matrix of data points and $D_c$ is a central pixel in the matrix of data points.

17. The method of claim 1, wherein the additional cloud indicator threshold is empirically derived from examining additional cloud indicator values for representative sets of empirical data points identified as cloud points or non-cloud points.

18. The method of claim 1, wherein the method is iterated for each of a number of data points in a set of imaging data.

19. A method for determining whether a data point of an image indicates a presence of a cloud using data including visible, near-infrared, and short wavelength infrared data, the method comprising:

performing a first comparison of a cirrus-band reflectance of the data point with a threshold cirrus-band reflectance value and classifying the data point as a cloud point if the cirrus-band reflectance of the data point exceeds the threshold cirrus-band reflectance value;

when the first comparison does not classify the data point as a cloud point, performing a comparison of a normalized difference snow index with at least one normalized difference snow index threshold; and classifying the data point as a non-cloud point when the normalized difference snow index falls in a range compared to at least one normalized difference snow index threshold indicating the data point is a non-cloud point.

20. The method of claim 19, wherein the cirrus-band includes approximately a 1.88 μm wavelength cirrus band.

21. The method of claim 19, wherein the cirrus-band includes approximately a 1.38 μm wavelength cirrus band.

22. The method of claim 19, wherein the additional cloud indicator threshold includes a normalized difference snow index snow threshold such that the data point is classified as a non-cloud point when the normalized difference snow index exceeds the normalized difference snow index snow threshold.

23. The method of claim 19, wherein the additional cloud indicator threshold includes a normalized difference snow index snow threshold and a normalized difference snow index cloud threshold such that the data point is classified as a cloud point when the normalized difference snow index is greater than or equal to the normalized difference snow index cloud threshold and the normalized difference snow index is less than or equal to the normalized difference snow index snow threshold.

24. The method of claim 23, wherein the normalized difference snow index cloud threshold includes $[(N_M - N_L)/D_T]*D + N_L$ and the normalized snow index snow threshold includes $[(N_M - N_H)/D_T]*D + N_L$.

25. The method of claim 19, wherein the normalized difference snow index is:

$$NDSI = (\rho_{Green} - \rho_{SWIR1})/(\rho_{Green} + \rho_{SWIR1}).$$

26. The method of claim 19, further comprising analyzing at least one additional cloud indicator for the data point when the first comparison of a cirrus-band reflectance of the data point with the threshold cirrus-band reflectance value and the comparison of the normalized difference snow index and at least one normalized difference snow index threshold do not classify the data point as one of a cloud point or a non-cloud point to a predetermined classification precision indicated by non-real-time analyses and cloud mask evaluations.

27. The method of claim 26, wherein the additional cloud indicator includes a near infrared to short-wavelength infrared ratio and the additional cloud indicator threshold includes a near infrared to short-wavelength infrared ratio snow threshold such that the data point is classified as a non-cloud point when the near infrared to short-wavelength infrared ratio exceeds the near infrared to short-wavelength infrared ratio snow threshold.

28. The method of claim 26, wherein the additional cloud indicator includes a red spectrum reflectance and the additional cloud indicator threshold includes a red spectrum reflectance cloud threshold such that the data point is classified as a non-cloud point when the red spectrum reflectance is less than the red spectrum reflectance cloud threshold.

29. The method of claim 26, wherein the additional cloud indicator includes a short-wavelength infrared reflectance and the additional cloud indicator threshold includes a short-wavelength reflectance cloud threshold such that the data point is classified as a non-cloud point when the short-wavelength reflectance is less than the short-wavelength reflectance cloud threshold.

30. The method of claim 26, wherein the additional cloud indicator includes a D variable and the additional cloud indicator threshold includes a D variable cloud threshold such that the data point is classified as a non-cloud point when the D variable exceeds the D variable cloud threshold.

31. The method of claim 30, wherein the D variable is:

$$D = |NDVI|^{0.6}/(\rho_{Red})^2$$

and where the normalized difference vegetation index, NDVI, is:

$$NDVI = (\rho_{NIR} - \rho_{Red})/(\rho_{NIR} + \rho_{Red}).$$

32. The method of claim 26, wherein the additional cloud indicator includes a D spatial variability index and the additional cloud indicator threshold includes a D spatial variability index cloud threshold such that the data point is classified as a non-cloud point when the a D spatial variability index is greater than the D spatial variability index cloud threshold.

33. The method of claim 32, wherein the D spatial variability index is:

$$DSVI = |D_m - D_c|$$

where $D_m$ is mean of D values for a matrix of data points including at least a three-by-three matrix of data points and $D_c$ is a central pixel in the matrix of data points.

34. The method of claim 26, wherein the additional cloud indicator threshold is empirically derived from examining additional cloud indicator values for representative sets of empirical data points manually identified as cloud points or non-cloud points.

35. The method of claim 19, wherein the method is iterated for each of a number of data points in a set of imaging data.

36. A method for determining whether a data point of an image indicates a presence of a cloud using data including visible, near-infrared, and short wavelength infrared data, the method comprising:

performing a first comparison of a cirrus-band reflectance of the data point with a threshold cirrus-band reflectance value and classifying the data point as a cloud point if the cirrus-band reflectance of the data point exceeds the threshold cirrus-band reflectance value;

performing a second comparison of a normalized difference snow index with a normalized difference snow index cloud threshold such that the data point is classified as a non-cloud point when the normalized difference snow index is less than the normalized difference snow index cloud threshold;

performing a third comparison of a D variable with a D variable cloud threshold such that the data point is classified as a non-cloud point when the D variable exceeds the D variable cloud threshold;

performing a fourth comparison of a D spatial variability index with a D spatial variability index cloud threshold such that the data point is classified as a non-cloud point when the a D spatial variability index exceeds the D spatial variability index cloud threshold;

performing a fifth comparison of a near infrared to short-wavelength infrared ratio and a near infrared to short-wavelength infrared ratio cloud threshold such that the data point is classified as a non-cloud point when the near infrared to short-wavelength infrared ratio is less than the near infrared to short-wavelength infrared ratio cloud threshold; and performing at least one additional comparison of an additional cloud indicator with at least one additional cloud indicator threshold.

37. The method of claim 36, wherein the cirrus-band is approximately a 1.88 μm wavelength cirrus band.

38. The method of claim 36, wherein the cirrus-band is approximately a 1.38 μm wavelength cirrus band.

39. The method of claim 36, wherein the normalized difference snow index is:

$$NDSI = (\rho_{Green} - \rho_{SWIR1})/(\rho_{Green} + \rho_{SWIR1}).$$

40. The method of claim 36, wherein the D variable is:

$$D = |NDVI|^{0.6}/(\rho_{Red})_2$$

and where the normalized difference vegetation index, NDVI, is:

$$NDVI = (\rho_{NIR} - \rho_{Red})/(\rho_{NIR} + \rho_{Red}).$$

41. The method of claim 36, wherein the D spatial variability index is:

$$DSVI = |D_m - D_c|$$

where $D_m$ is mean of D values for a matrix of data points including at least a three-by-three matrix of data points and $D_c$ is a central pixel in the matrix of data points.

42. The method of claim 36, wherein the additional cloud indicator includes the normalized difference snow index and the additional cloud indicator threshold includes a normalized difference snow index snow threshold such that the data point is classified as a non-cloud point when the normalized difference snow index exceeds the normalized difference snow index snow threshold.

43. The method of claim 36, wherein the additional cloud indicator includes the near infrared to short-wavelength infrared ratio and the additional cloud indicator threshold includes the near infrared to short-wavelength infrared ratio snow threshold such that the data point is classified as a non-cloud point when the near infrared to short-wavelength infrared ratio exceeds the near infrared to short-wavelength infrared ratio snow threshold.

44. The method of claim 36, wherein the additional cloud indicator includes a short-wavelength infrared spectrum reflectance and the additional cloud indicator threshold includes a short-wavelength infrared spectrum reflectance cloud threshold such that the data point is classified as a non-cloud point when the short-wavelength infrared spectrum reflectance is less than the short-wavelength infrared spectrum reflectance cloud threshold.

45. The method of claim 36, wherein threshold data is empirically derived from examining cloud indicator values for representative sets of empirical data points manually identified as cloud points or non-cloud points.

46. The method of claim 36, wherein the method is iterated for each of a number of data points in a set of imaging data.

47. A computer-readable medium having stored thereon instructions for determining whether a data point of an image indicates a presence of cloud using data including visible, near-infrared, and short wavelength infrared data, the computer-readable medium comprising:

first computer program code means for performing a first comparison of a cirrus-band reflectance of the data point with a cirrus-band reflectance threshold and classifying the data point as a cloud point if the cirrus-band reflectance of the data point exceeds the cirrus-band reflectance threshold; and when the first computer program code means does not classify the data point as a cloud point, engaging second computer program code means for performing a further analysis of the data point including:

third computer program code means for performing a second comparison of an additional cloud indicator with an additional cloud indicator threshold, the additional cloud indicator being derived from at least one of the visible, near-infrared, and short wavelength infrared data; and fourth program code means for classifying the data point as one of a cloud point or a non-cloud-point when the second comparison of the additional cloud indicator with the additional cloud indicator threshold allows the data point to be classified as one of a cloud point or a non-cloud point.

48. The computer-readable medium of claim 47, wherein the cirrus-band is approximately a 1.88 µm wavelength cirrus band.

49. The computer-readable medium of claim 47, wherein the cirrus-band is approximately a 1.38 µm wavelength cirrus band.

50. The computer-readable medium of claim 47, wherein the additional cloud indicator includes a normalized difference snow index and the additional cloud indicator threshold includes at least one normalized difference snow index threshold.

51. The computer-readable medium of claim 50, wherein the additional cloud indicator threshold includes a normalized difference snow index snow threshold such that the data point is classified as a non-cloud point when the normalized difference snow index exceeds the normalized difference snow index snow threshold.

52. The computer-readable medium of claim 50, wherein the additional cloud indicator threshold includes a normalized difference snow index cloud threshold and a normalized difference snow index snow threshold such that the data point is classified as a cloud point when the normalized difference snow index is greater than or equal to the normalized difference snow index cloud threshold and the normalized difference snow index is less than or equal to the normalized difference snow index snow threshold.

53. The computer-readable medium of claim 52, wherein the normalized difference snow index cloud threshold includes $[(N_M-N_L)/D_T]*D+N_L$ and the normalized snow index snow threshold includes $[(N_M-N_H)/D_T]*D+N_L$.

54. The computer-readable medium of claim 50, wherein the normalized difference snow index is:

$NDSI=(\rho_{Green}-\rho_{SWIR1})/(\rho_{Green}+\rho_{SWIR1})$.

55. The computer-readable medium of claim 47, wherein the additional cloud indicator includes a near infrared to short-wavelength infrared ratio and the additional cloud indicator threshold includes a near infrared to short-wavelength infrared ratio snow threshold such that the data point is classified as a non-cloud point when the near infrared to short-wavelength infrared ratio exceeds the near infrared to short-wavelength infrared ratio snow threshold.

56. The computer-readable medium of claim 47, wherein the additional cloud indicator includes a red spectrum reflectance and the additional cloud indicator threshold includes a red spectrum reflectance cloud threshold such that the data point is classified as a non-cloud point when the red spectrum reflectance is less than the red spectrum reflectance cloud threshold.

57. The computer-readable medium of claim 47, wherein the additional cloud indicator includes a short-wavelength infrared reflectance and the additional cloud indicator threshold includes a short-wavelength reflectance cloud threshold such that the data point is classified as a non-cloud point when the short-wavelength reflectance is less than the short-wavelength reflectance cloud threshold.

58. The computer-readable medium of claim 47, wherein the additional cloud indicator includes a D variable and the additional cloud indicator threshold includes a D variable cloud threshold such that the data point is classified as a non-cloud point when the D variable exceeds the D variable cloud threshold.

59. The computer-readable medium of claim 58, wherein the D variable is:

$D=|NDVI|^{0.6}/(\rho_{Red})^2$ and where the normalized difference vegetation index, NDVI, is:

$NDVI=(\rho_{NIR}-\rho_{Red})/(\rho_{NIR}+\rho_{Red})$.

60. The computer-readable medium of claim 47, wherein the additional cloud indicator includes a D spatial variability index and the additional cloud indicator threshold includes a D spatial variability index cloud threshold such that the data point is classified as a non-cloud point when the a D spatial variability index is greater than the D spatial variability index cloud threshold.

61. The computer-readable medium of claim 60, wherein the D spatial variability index is:

$DSVI=|D_m-D_c|$ where $D_m$ is mean of D values for a matrix of data points including at least a three-by-three matrix of data points and $D_c$ is a central pixel in the matrix of data points.

62. The computer-readable medium of claim 47, wherein the additional cloud indicator threshold is empirically derived from examining additional cloud indicator values for representative sets of empirical data points identified as cloud points or non-cloud points.

63. The computer-readable medium of claim 47, wherein the instructions stored on the computer-readable medium are iterated for each of a number of data points in a set of imaging data.

64. A system for determining whether a data point of an image indicates a presence of cloud using data including visible, near-infrared, and short wavelength infrared data, the system comprising:

a cirrus-band comparator configured to perform a first comparison of a cirrus-band reflectance of the data point with a cirrus-band reflectance threshold and to classify the data point as a cloud point if the cirrus-band reflectance of the data point exceeds the cirrus-band reflectance threshold; and a secondary comparator configured to perform at least one secondary comparison when the cirrus-band comparator does not classify the data point as a cloud point, the secondary comparator being configured to perform the second comparison of an additional cloud indicator with an additional cloud indicator threshold, the additional cloud indicator being derived from at least one of the visible, near-infrared, and short wavelength infrared data, and further configured to classify the data point as one of a cloud point or a non-cloud-point.

65. The system of claim 64, wherein the cirrus-band is approximately a 1.88 µm wavelength cirrus band.

66. The system of claim 64, wherein the cirrus-band is approximately a 1.38 µm wavelength cirrus band.

67. The system of claim 64, wherein the additional cloud indicator includes a normalized difference snow index and the additional cloud indicator threshold includes at least one normalized difference snow index threshold.

68. The system of claim 67, wherein the additional cloud indicator threshold includes a normalized difference snow index snow threshold such that the data point is classified as a non-cloud point when the normalized difference snow index exceeds the normalized difference snow index snow threshold.

69. The system of claim 67, wherein the additional cloud indicator threshold includes a normalized difference snow index cloud threshold and a normalized difference snow index snow threshold such that the data point is classified as a cloud point when the normalized difference snow index is greater than or equal to the normalized difference snow index cloud threshold and the normalized difference snow index is less than or equal to the normalized difference snow index snow threshold.

70. The system of claim 69, wherein the normalized difference snow index cloud threshold includes $[(N_M - N_L)/D_T]*D + N_L$ and normalized snow index snow threshold includes $[(N_M - N_H)/D_T]*D + N_L$.

71. The system of claim 67, wherein the normalized difference snow index is:

$$NDSI = (\rho_{Green} - \rho_{SWIR1})/(\rho_{Green} + \rho_{SWIR1}).$$

72. The system of claim 64, wherein the additional cloud indicator includes a near infrared to short-wavelength infrared ratio and the additional cloud indicator threshold includes a near infrared to short-wavelength infrared ratio snow threshold such that the data point is classified as a non-cloud point when the near infrared to short-wavelength infrared ratio exceeds the near infrared to short-wavelength infrared ratio snow threshold.

73. The system of claim 64, wherein the additional cloud indicator includes a red spectrum reflectance and the additional cloud indicator threshold includes a red spectrum reflectance cloud threshold such that the data point is classified as a non-cloud point when the red spectrum reflectance is less than the red spectrum reflectance cloud threshold.

74. The system of claim 64, wherein the additional cloud indicator includes a short-wavelength infrared reflectance and the additional cloud indicator threshold includes a short-wavelength reflectance cloud threshold such that the data point is classified as a non-cloud point when the short-wavelength reflectance is less than the short-wavelength reflectance cloud threshold.

75. The system of claim 64, wherein the additional cloud indicator includes a D variable and the additional cloud indicator threshold includes a D variable cloud threshold such that the data point is classified as a non-cloud point when the D variable exceeds the D variable cloud threshold.

76. The system of claim 75, wherein the D variable is:

$$D = |NDVI|^{0.6}/(\rho_{Red})^2$$

and where the normalized difference vegetation index, NDVI, is:

$$NDVI = (\rho_{NIR} - \rho_{Red})/(\rho_{NIR} + \rho_{Red}).$$

77. The system of claim 64, wherein the additional cloud indicator includes a D spatial variability index and the additional cloud indicator threshold includes a D spatial variability index cloud threshold such that the data point is classified as a non-cloud point when the a D spatial variability index is greater than the D spatial variability index cloud threshold.

78. The system of claim 77, wherein the D spatial variability index is:

$$DSVI = |D_m - D_c|$$

where $D_m$ is mean of D values for a matrix of data points including at least a three-by-three matrix of data points and $D_c$ is a central pixel in the matrix of data points.

79. The system of claim 64, wherein the additional cloud indicator threshold is empirically derived from examining additional cloud indicator values for representative sets of empirical data points identified as cloud points or non-cloud points.

80. The system of claim 64, wherein the system is further configured to iteratively process each of a number of data points in a set of imaging data.

* * * * *